US009026707B2

(12) United States Patent
Tsuji

(10) Patent No.: US 9,026,707 B2
(45) Date of Patent: May 5, 2015

(54) ELECTRONIC APPARATUS

(75) Inventor: Kiyotaka Tsuji, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 511 days.

(21) Appl. No.: 13/523,614

(22) Filed: Jun. 14, 2012

(65) Prior Publication Data

US 2012/0324134 A1    Dec. 20, 2012

(30) Foreign Application Priority Data

Jun. 15, 2011   (JP) .................................. 2011-133580
May 24, 2012   (JP) .................................. 2012-118917

(51) Int. Cl.
*G06F 13/00*   (2006.01)
*H04L 25/02*   (2006.01)

(52) U.S. Cl.
CPC ..................................... *H04L 25/02* (2013.01)

(58) Field of Classification Search
USPC .................................. 710/301–306, 316–317
See application file for complete search history.

(56) References Cited

U.S. PATENT DOCUMENTS

| 7,706,309 | B2 | 4/2010 | Shibata et al. | |
|---|---|---|---|---|
| 7,895,366 | B2 | 2/2011 | Hibi | |
| 8,050,333 | B2 * | 11/2011 | Muto et al. ..................... | 375/257 |
| 2002/0172151 | A1 | 11/2002 | Nakada et al. | |
| 2003/0061430 | A1 * | 3/2003 | Soetemans et al. ........... | 710/300 |
| 2004/0158667 | A1 * | 8/2004 | Carr ............................... | 710/301 |
| 2005/0036454 | A1 | 2/2005 | Murata et al. | |
| 2009/0063741 | A1 * | 3/2009 | Lu .................................. | 710/301 |
| 2010/0100657 | A1 * | 4/2010 | Ji et al. .......................... | 710/300 |

FOREIGN PATENT DOCUMENTS

| CN | 1581697 | 2/2005 |
|---|---|---|
| CN | 101103340 | 1/2008 |
| JP | 2005-260361 | 9/2005 |
| JP | 2008-022392 | 1/2008 |

OTHER PUBLICATIONS

Toshiba Background Art Information document with Concise Explanation for Japanese Reference No. 3, undated, in 1 page.
Chinese Notification of Second Office Action for corresponding Chinese Application No. 201210202043.9, dated Oct. 16, 2014, in 12 pages.

* cited by examiner

*Primary Examiner* — Glenn A Auve
*Assistant Examiner* — Kim T. Huynh
(74) *Attorney, Agent, or Firm* — Knobbe, Martens, Olson & Bear LLP

(57) ABSTRACT

According to one embodiment, a monitor/control unit of an electronic circuit board monitors the receiving state of a transmitting/receiving circuit unit and controls a parameter setting unit, causing the same to change the reception parameter of the transmitting/receiving circuit unit, and if the receiving state remains not changed to a specified state, the monitor/control unit informs a host control device of this fact. The host control device instructs the switching process board to designate a channel, thereby to change, the specified state, the receiving sate of the electronic circuit board associated with the channel informed of that fact.

13 Claims, 5 Drawing Sheets

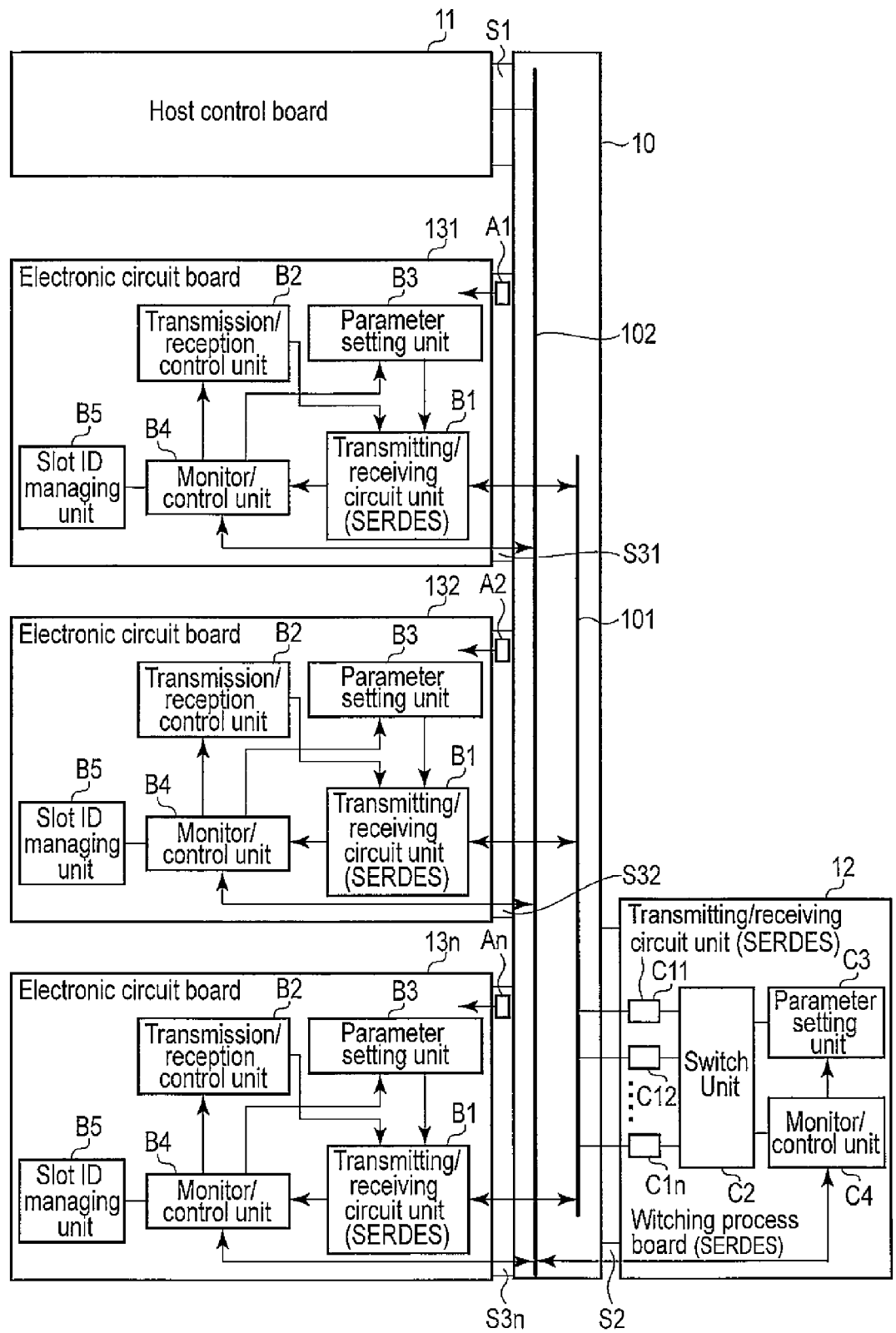
F I G. 1

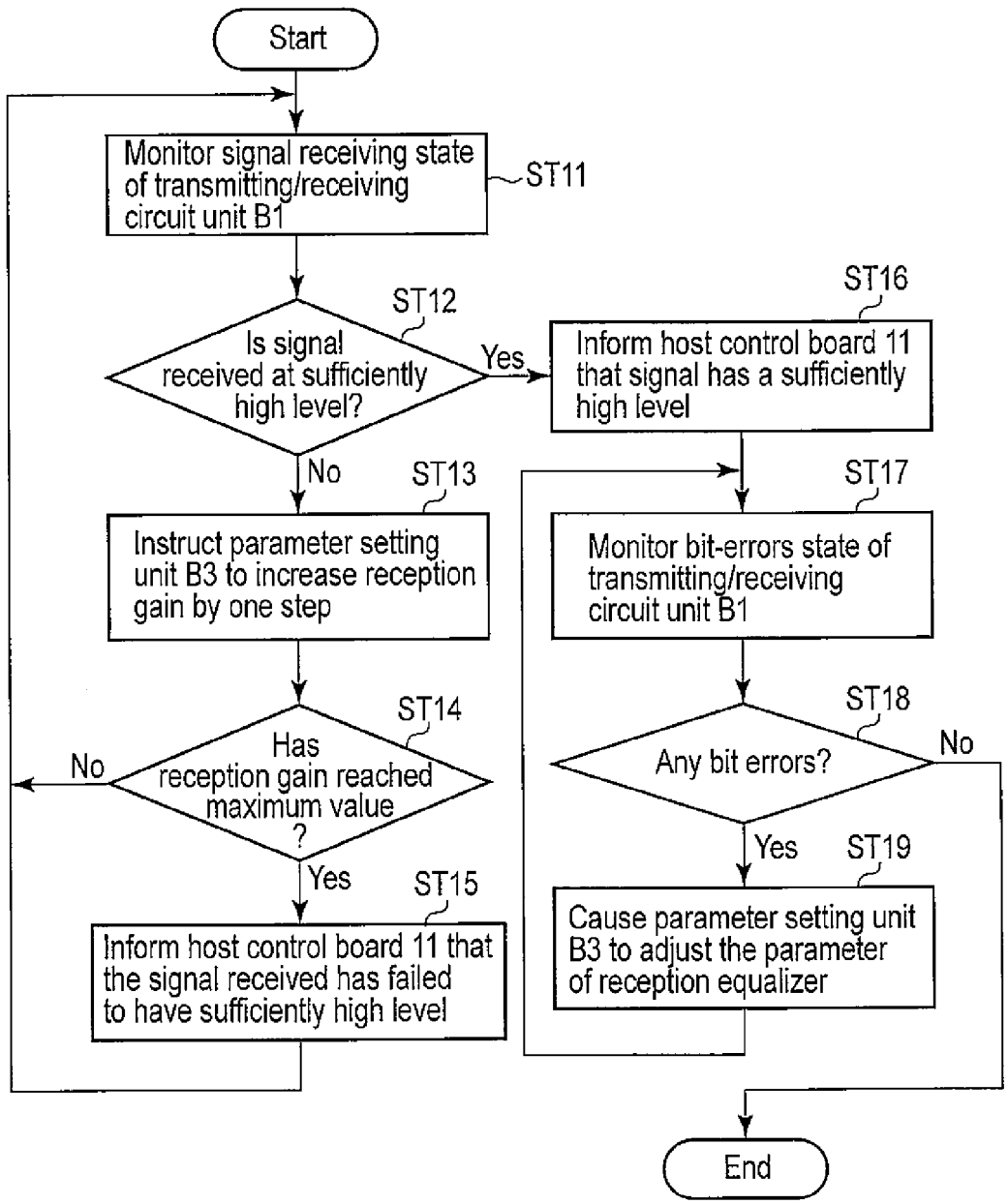
F I G. 2

ELECTRONIC APPARATUS

CROSS-REFERENCE TO RELATED APPLICATIONS

This application is based upon and claims the benefit of priority from prior Japanese Patent Applications No. 2011-133580, filed Jun. 15, 2011, and No. 2012-118917, filed May 24, 2012; the entire contents of all of which are incorporated herein by reference.

FIELD

Embodiments described herein relate generally to an electronic apparatus that has the function of managing the quality of signal transmission between a plurality of electronic circuit boards inserted in a plurality of slots of transmission paths.

BACKGROUND

In an electronic apparatus such as the broadcasting transmission apparatus disclosed in Jpn. Pat. Appln. KOKAI Publication No. 2008-22392, electronic circuit boards, each having a specific processing function, are removably connected to the free slots of the motherboard, respectively. On the motherboard, transmission paths are provided to transmit signals in differential mode between the electronic circuit boards inserted in the free slots.

As the speed of processing and transmitting signals increases in the electronic apparatus described above, the signal transmission distance between the circuit boards grows more important. The conventional motherboard having free slots is indeed advantageous in that each circuit board can be connected to any slot. However, the signal transmission distance between the boards is inevitably indefinite. Consequently, the transmission quality fails to be uniform, possibly resulting in transmission errors.

Particularly in any electronic circuit board, the parameters such as signal-amplitude level, drive current level and frequency-adjusting value, all enhancing the transmission quality, are fixed. The distance for which good transmission quality can be acquired between the boards is inevitably limited. This limits the number of slots that can be used at the electronic apparatus.

BRIEF DESCRIPTION OF THE DRAWINGS

FIG. 1 is a block diagram showing an exemplary configuration of an electronic apparatus according to an embodiment;

FIG. 2 is a flowchart showing the sequence of the reception setting process performed in the monitor/control unit of each electronic circuit board used in the embodiment of FIG. 1;

DETAILED DESCRIPTION

Figure 3:
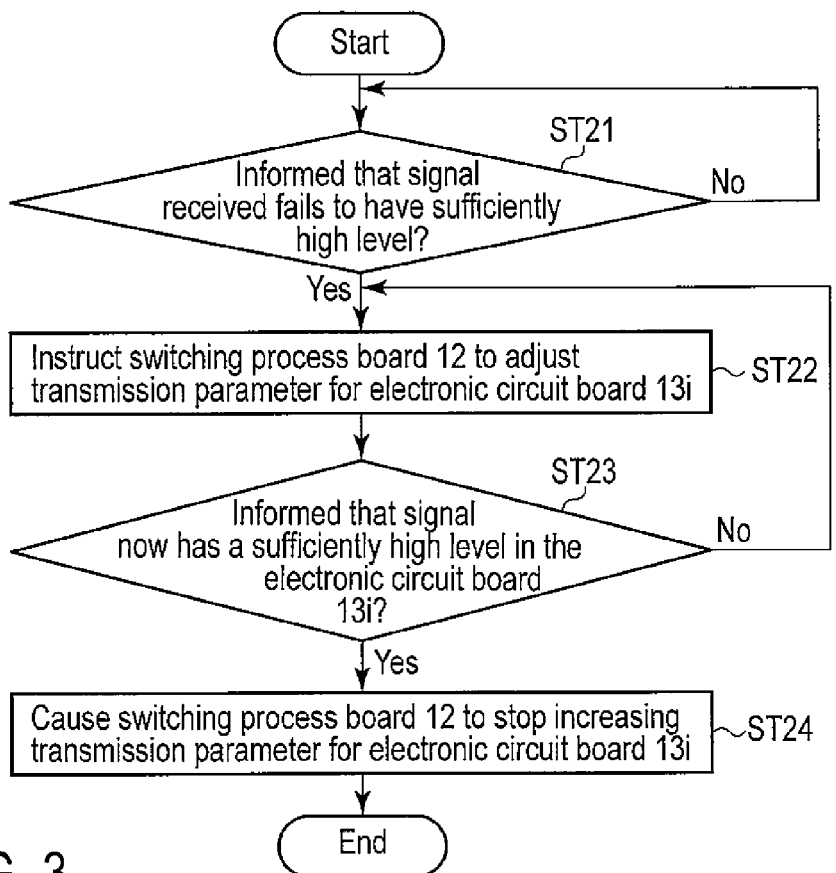
FIG. 3 is a flowchart showing the sequence of the reception setting process performed in the electronic circuit board mounted on the host control board used in the embodiment of FIG. 1.

In general, according to one embodiment, there is provided an electronic apparatus comprising: a transmission device comprising a plurality of free slots associated with a plurality of channels and configured to connect boards to a transmission path, and a fixed slot connected to all free slots by the transmission path; a host control device configured to manage quality of signals transmitted from and to the boards connected to the free slots and a dedicated slot; an electronic circuit board to be inserted into any one of the free slots associated with the channels, and comprising a first transmitting/receiving circuit unit configured to transmit and receive signals through the transmission path in accordance with a transmission/reception parameter, a transmission/reception control unit configured to control a transmitting/receiving process at the first transmitting/receiving circuit unit, a first parameter setting unit configured to set a transmission/reception parameter to the first transmitting/receiving circuit unit, and a first monitor/control unit configured to monitor the operating state of the first transmitting/receiving circuit unit and to control the first parameter setting unit; and a switching process board to be connected to the dedicated slot, and comprising a plurality of second transmitting/receiving circuit units configured to transmit and receive signals between the electronic circuit boards to be connected to the free slots, respectively, in accordance with a transmission/reception parameter, a switch unit configured to turn on or off the second transmitting/receiving circuit units, a second parameter setting unit configured to set the transmission/reception parameter to the second transmitting/receiving circuit units associated with the channels, respectively, and a second monitor/control unit configured to monitor the operating state of each second transmitting/receiving circuit unit and control the second parameter setting unit.

In the electronic apparatus, while any one of the electronic circuit boards remains inserted in any free slot in an initial state, the first monitor/control unit of the electronic circuit board monitors the receiving state of the first transmitting/receiving circuit unit and controls the first parameter setting unit, causing the same to change the reception parameter of the first transmitting/receiving circuit unit, and if the receiving state remains not changed to a specified state, the first monitor/control unit informs the host control device of this fact; the host control device instructs the switching process board to designate a channel, thereby to change, the specified state, the receiving sate of the electronic circuit board associated with the channel informed of that fact; and the second monitor/control unit of the switching process board causes the second parameter setting unit to change the transmission parameter of the second transmitting/receiving circuit unit of the channel designated by the host control device.

An embodiment will be described with reference to the accompanying drawings.

FIG. 1 is a block diagram showing an exemplary configuration of an electronic apparatus according to the embodiment. More precisely, FIG. 1 shows an electronic apparatus having boards in number n.

In the electronic apparatus, a motherboard 10 used as transmission device is arranged in the housing. The motherboard 10 comprises a first slot S1, a second slot S2, and third slots S31 to S3n. The third slots S31 to S3n are associated with n channels, respectively. The motherboard 10 further comprises a serial bus 101 and a control bus 102, both used as transmission paths. To the serial bus 101, there are connected transmission/reception signal lines, which are associated with the first slot S1, second slot S2 and third slots S31 to S3$n$, respectively. To the control bus 102, there are connected control signal lines, which are associated with the first slot S1, second slot S2 and third slots S31 to S3$n$, respectively. The first slot S1 and the second slot S2 are dedicated slots, to which a host control board 11 and a switching process board 12 are removably connected, respectively. The third slots S31 to S3$n$ associated with n channels, respectively, are free slots in which n electronic circuit boards 131 to 13$n$ are removably inserted, respectively, in indefinite order. The third slots S31 to S3$n$ have slot-identification data (slot ID) issuing units A1 to An, respectively. The slot ID issuing units A1 to An are configured to issue slot IDs when the electronic circuit boards 31 to 3$n$ are inserted into the slots. The slot IDs so issued are supplied to the electronic circuit boards 31 to 3$n$, respectively.

The host control board 11 manages the quality of the signals transmitted to and from the electronic circuit boards 131 to 13$n$ connected to the third slots S31 to S3$n$ of the motherboard 10 and also the quality of the signals transmitted to and from the switching process board 12 connected to the second slot S2.

Each electronic circuit board 13$i$ comprises a transmitting/receiving circuit unit (SERDES, or SERializer/DESerializer) B1, a transmission/reception control unit B2, a parameter setting unit B3, a monitor/control unit B4, and a slot ID managing unit B5. The transmitting/receiving circuit unit B1 is a circuit having the function of parallel serial conversion of transmitting and receiving signals via the serial bus of the motherboard 10, in accordance with any parameter set. The transmission/reception control unit B2 controls the signal transmission and receipt at the transmitting/receiving circuit unit B1. The parameter setting unit B3 sets transmission/reception parameters to the slot ID issuing unit Ai. The monitor/control unit B4 monitors the operation of the transmitting/receiving circuit unit B1, and controls the parameter setting unit B3 in accordance with the instruction coming from the host control board 11, causing the parameter setting unit B3 to set an appropriate transmission/reception parameter to the transmitting/receiving circuit unit B1. When the electronic circuit board 13$i$ is inserted into any one of the third slots S3$i$ of the motherboard 10, the slot ID managing unit B5 receives the slot ID issued from the slot ID issuing unit Ai of the third slot S3$i$ and registers the slot ID. Note that a transmission parameter and a reception parameter for each slot ID, which accord with the distance from the switching process board 12, have been registered in the parameter setting unit B3.

The transmission parameter is, for example, signal amplitude value or drive current value. The reception parameter is, for example, reception gain or equalizer value. The monitor/control unit B4 monitors the signal receiving state of the transmitting/receiving circuit unit B1, and also monitors the level of the signal received and the bit errors in the signal received. The monitor/control unit B4 then controls the parameter setting unit B3, causing the same to change the reception parameter, i.e., reception gain or equalizer value, to an appropriate value. Moreover, the monitor/control unit B4 causes the parameter setting unit B3 to change the transmission parameter, i.e., signal amplitude or drive current.

The switching process board 12 holds transmitting/receiving circuit units (SERDES, or SERializer/DESerializer) C11 to C1$n$, a switch unit C2, a parameter setting unit C3, and a monitor/control unit C4. The transmitting/receiving circuit units C11 to C1$n$ are connected, respectively, to the n channel transmission lines, which are connected to the serial bus of the motor board 10 through the second slot S2. The transmitting/receiving circuit unit C1$i$ of i channel is a circuit that has the function of parallel serial conversion of transmitting signals to, and receiving signals from, the electronic circuit board 13$i$ connected to the third slot S3$i$ of i channel, through the serial bus of the motherboard 10 in accordance with the transmission/reception parameters set. The switch unit C2 can turns on or off the transmitting/receiving circuit unit C1$i$ of the channel designated by the instruction coming from the monitor/control unit C4. The parameter setting unit C3 sets transmission/reception parameters to the transmitting/receiving circuit units C11 to C1$n$. The monitor/control unit C4 monitors the operating states of the transmitting/receiving circuit units C11 to C1$n$, and controls the parameter setting unit C3 in accordance with operating state of the units C11 to C1$n$ or with the instruction coming from the host control board 11, causing the host control board 11 to set appropriate transmission/reception parameters to the transmitting/receiving circuit units C11 to C1$n$.

The transmission parameter is, for example, signal amplitude value or drive current value, and the reception parameter is, for example, reception gain or equalizer value. The monitor/control unit C4 monitors the signal receiving state of the transmitting/receiving circuit unit C1$i$, detecting the level of any received signal and the bit errors therein, and causes the parameter setting unit C3 to set the reception gain and the reception gain of the equalizer, both to appropriate values. The monitor/control unit C4 further controls the parameter setting unit C3 in accordance with the instruction coming from the host control board 11, making the same to change the transmission parameter for the signal amplitude or the drive current.

The electronic apparatus configured as described above is initially set and adjusted as will be explained below.

When the electronic circuit board 13$i$ is inserted into any one of the third slots S31 to S3$n$ (thus, turning the apparatus power supply on or plugging the board live line), the monitor/control unit B4 reads the slot ID issued from the slot ID issuing unit Ai of the third slot S3$i$ and registers this slot ID in the slot ID managing unit B5, and reads the transmission parameter associated with the slot ID from the parameter setting unit B3 and initially sets this slot ID to the transmitting/receiving circuit unit B1.

Thus, once the channel is selected for the third slot S3$i$ in which to insert the electronic circuit board 13$i$, the distance from the slot S3$i$ to the switching process board 12 is determined. In view of this, the transmission/reception parameters associated with various distances between each slot and the switching process board 12 are registered in the parameter setting unit B3 in the electronic apparatus according to the embodiment. When the electronic circuit board 13$i$ is inserted into the third slot S3$i$, the transmission/reception parameter associated with the slot ID so read is read from the parameter setting unit B3 and is set to the transmitting/receiving circuit unit B1. Therefore, an appropriate transmission/reception parameter can be set, no matter into which third slot S3$i$ the electronic circuit board 13$i$ has been inserted, and the quality of the signals transmitted between the boards can thereby be stabilized. Moreover, the transmission/reception parameter can be set in a relatively short time, because it is associated with the slot ID.

Since the boards differ in characteristics, however, the transmission/reception parameter must be adjusted after the boards have been incorporated into the electronic apparatus.

How the transmission/reception parameter is adjusted for any electronic circuit board 13*i* and the switching process board 12 will be explained below.

First, how the parameter should be adjusted to enable the mother board 10 and the electronic circuit board 13*i* to reliably receive a signal output from the switching process board 12 will be explained with reference to FIG. 2 to FIG. 4.

FIG. 2 is a flowchart showing the sequence of the reception setting process performed in the monitor/control unit B4 of the electronic circuit board 13*i*. FIG. 3 is a flowchart showing the sequence of the reception setting process performed in the electronic circuit board 13*i* mounted on the host control board 11. FIG. 4 is a flowchart showing the sequence of the transmission setting process performed by the monitor/control unit C4 provided in the switching process board 12.

In the electronic circuit board 13*i*, the monitor/control unit B4 monitors the signal receiving state of the transmitting/receiving circuit unit B1 as shown in FIG. 2 after the electronic circuit board 13*i* has been inserted into a slot and thereby activated (Step ST11). Then, the monitor/control unit B4 determines whether the signal received is at a sufficiently high level (Step ST12). If the signal is not found to have a sufficiently high level (if No in Step ST12), the monitor/control unit B4 instructs the parameter setting unit B3 to increase the reception gain by one step (Step ST13). Then, the monitor/control unit B4 determines whether the reception gain has reached a maximum value (Step ST14). If the reception gain is found not having reached the maximum value (if No in Step ST14), the process returns to Step ST11, and the monitor/control unit B4 keeps monitoring the signal receiving state of the transmitting/receiving circuit unit B1. Until the signal is found in Step ST12 to have a sufficiently high level or until the reception gain is found in Step ST14 to have reached the maximum value, Step ST13 is repeated, gradually increasing the reception gain. If the reception gain is found to have reached the maximum value (if Yes in Step ST14), the host control board 11 is informed of the fact that the signal received has failed to have a sufficiently high level (Step ST15). If the reception gain is found to have reached the maximum value (if Yes in Step ST14), the host control board 11 is informed of this fact, i.e., the signal failing to have a sufficiently high level. If the signal is found to have a sufficiently high level (if Yes in Step ST12), the host control board 11 is informed of this fact, i.e., the signal having a sufficiently high level (Step ST16).

As shown in FIG. 3, the host control board 11 determines whether the notification indicates that the signal received fails to have a sufficiently high level in any electronic circuit board 13*i* (Step ST21). If the notification is found to indicate that the signal received fails to have a sufficiently high level (if Yes in Step ST21), the host control board 11 instructs the switching process board 12 to increase the signal amplitude or the transmission parameter for drive current, by one step, achieving transmission setting for the electronic circuit board 13*i* (Step ST22). The host control board 11 then determines whether the notification indicates that signal received now has a sufficiently high level in the electronic circuit board 13*i* (Step ST23). Step ST22 is repeated until the host control board 11 receives the notification indicating that signal received has reached a sufficiently high level. If the notification indicates that signal received now have a sufficiently high level (if Yes in Step ST23), host control board 11 stops Step ST22, and causes the switching process board 12 to stop increasing the transmission parameter (Step ST24).

Figure 4:
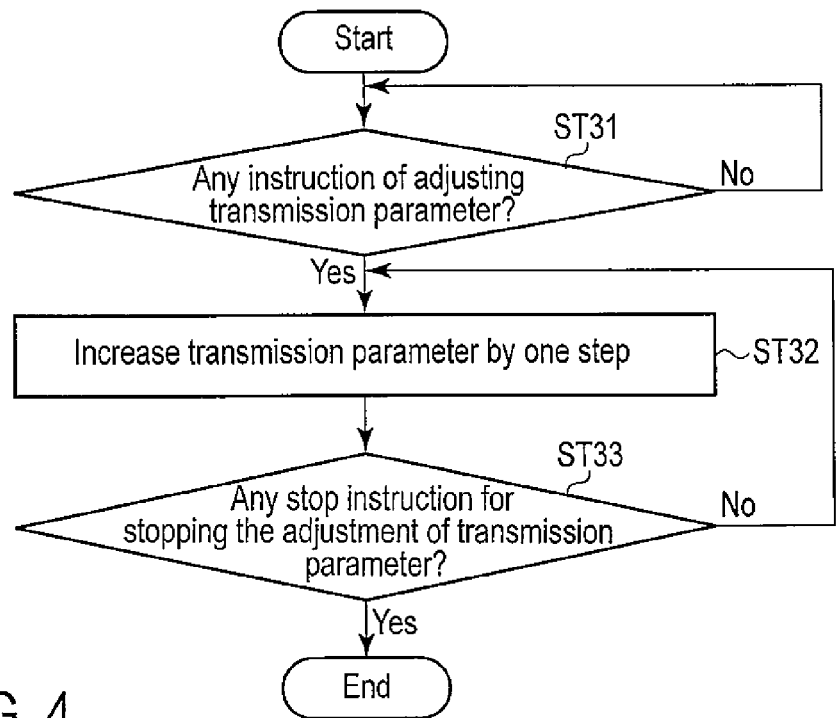
FIG. 4 is a flowchart showing the sequence of the transmission setting process performed in the switching process board used in the embodiment of FIG. 1.

In the switching process board 12, the monitor/control unit C4 receives a transmission setting instruction from the host control board 11 (Step ST31) as shown in FIG. 4. Then, the parameter setting unit C3 increases the signal amplitude for the transmitting/receiving circuit unit C1*i* or the transmission parameter for the drive current, by one step (Step ST32). The parameter setting unit C3 repeatedly increases the signal amplitude or the transmission parameter, until it receives a stop instruction (Step ST33).

On the other hand, in the electronic circuit board 13*i*, if the received signal is found to have a sufficiently high level (if Yes in Step ST12), the monitor/control unit B4 monitors the bit-errors state of the transmitting/receiving circuit unit B1 (Step ST17). Then, the monitor/control unit B4 determines whether signal has bit errors or not (Step ST18). If bit errors are found (if Yes in Step ST18), the monitor/control unit B4 controls the parameter setting unit B3, causing the same to adjust the parameter of the reception equalizer (Step ST19). Then, the monitor/control unit B4 returns to Step ST17, and keeps monitoring the bit-errors state. If bit errors are not found (if No in Step ST18), the reception setting process is terminated.

Once the process described above has completed, each electronic circuit board 13*i* associated with one channel can reliably receive the transmission signal output from the switching process board 12.

How to adjust the parameter to enable the switching process board 12 to reliably receive a transmission signal output from each electronic circuit board 13*i* associate with one channel will be explained with reference to FIG. 5 to FIG. 7.

Figure 5:
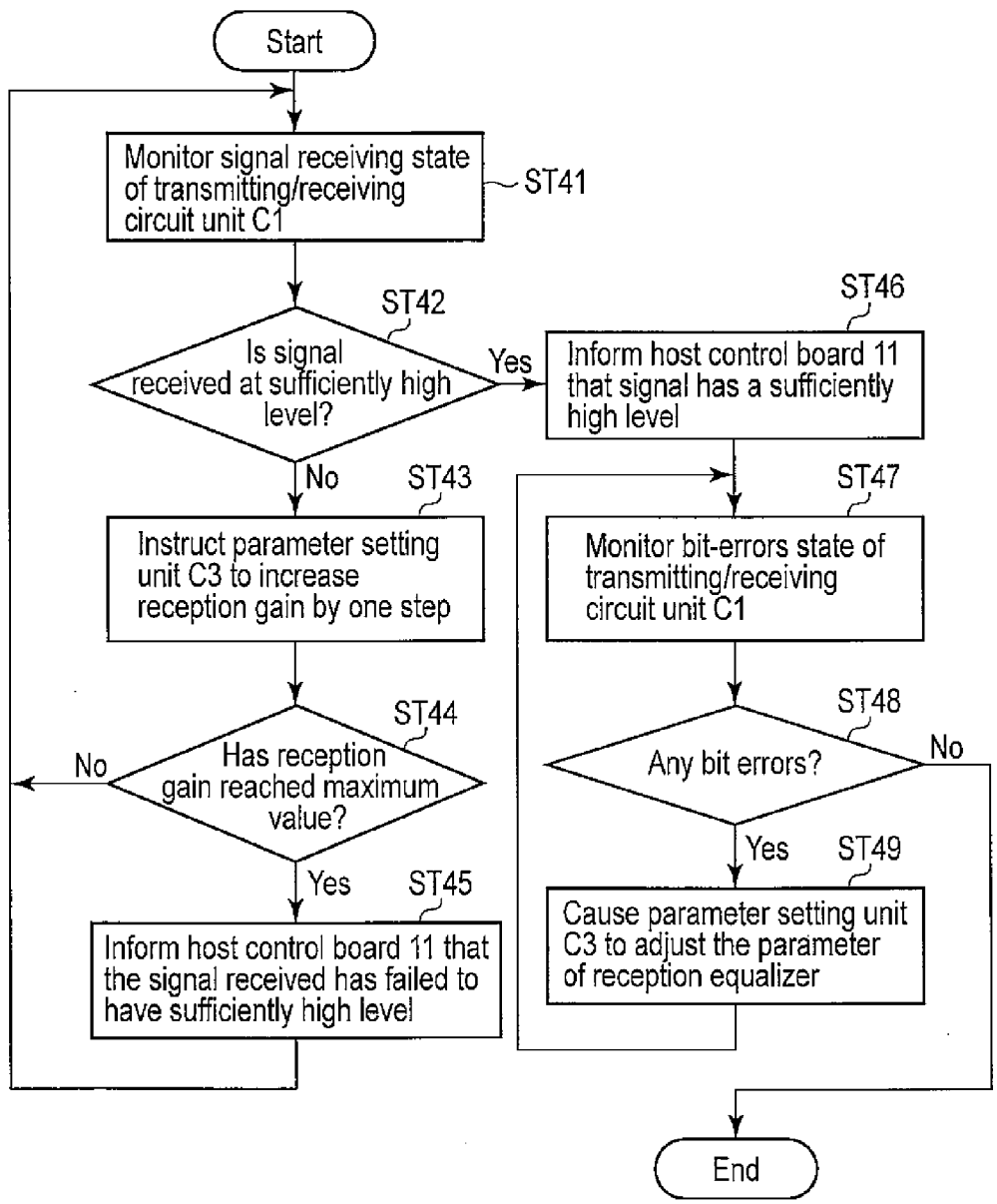
FIG. 5 is a flowchart showing the sequence of the reception setting process performed in the switching process board used in the embodiment of FIG. 1.

FIG. 5 is a flowchart showing the sequence of the reception setting process performed in the monitor/control unit C4 provided on the switching process board 12. FIG. 6 is a flowchart showing the reception setting process performed on the switching process board 12 provided in the host control board 11. FIG. 7 is a flowchart showing the transmission setting process performed in the monitor/control unit B4 provided on each electronic circuit board 13*i*.

In the switching process board 12, the monitor/control unit C4 monitors the receiving state of the transmitting/receiving circuit C1*i* (Step ST41) as shown in FIG. 5. Thus, the monitor/control unit C4 determines whether the signal received has a sufficiently high level (Step ST42). If the signal received has a sufficiently high level is not found to have the sufficiently high level (if No in Step ST42), the signal received has a sufficiently high level instructs the parameter setting unit C3 to increase the reception gain by one step (Step ST43). Then, the monitor/control unit C4 determines whether the reception gain has reached a maximum value (Step ST44). If the reception gain is found not having reached the maximum value (if No in Step ST44), the monitor/control unit C4 returns to Step ST41, and keeps monitoring the signal receiving state. Until the signal is found in Step ST42 to have a sufficiently high level or until the reception gain is found in Step ST44 to have reached the maximum value, Step ST43 is repeated, gradually increasing the reception gain. If the reception gain is found to have reached the maximum value (if Yes in Step ST44), the monitor/control unit C4 informs the host control board 11 of the fact that the signal received fails to have a sufficiently high level (Step ST45). If the reception gain is found to have reached the maximum value (if Yes in Step ST44), the monitor/control unit C4 informs the host control board 11 of this fact, i.e., the signal having failed to have a sufficiently high level. If the signal is found to have a sufficiently high level (if Yes in Step ST12), the monitor/control unit C4 informs the host control board 11 of this fact, i.e., the signal now having a sufficiently high level (Step ST46).

Figure 6:
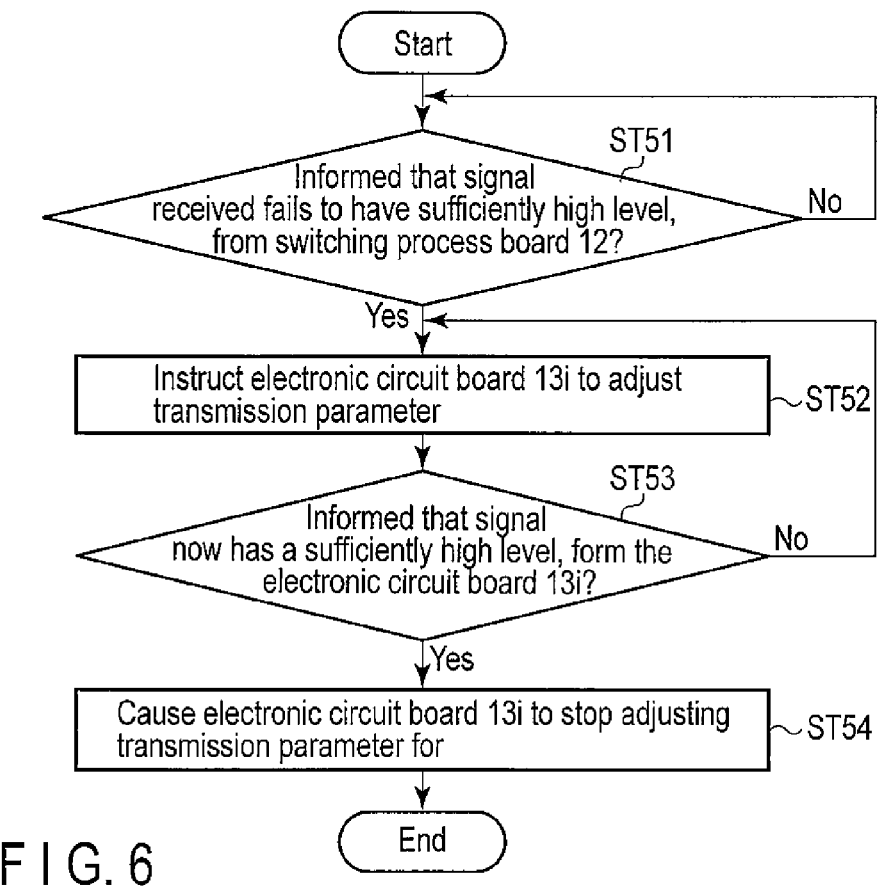
FIG. 6 is a flowchart showing the reception setting process performed in the switching process board mounted on the host control board used in the embodiment of FIG. 1.

Then, as shown in FIG. 6, the host control board 11 determines whether the notification indicates that the signal received fails to have a sufficiently high level in the switching process board 12 (Step ST51). If the notification is found to indicate that signal received fails to have a sufficiently high (if Yes in Step ST51), the host control board 11 instructs the switching process board 12 to increase the signal amplitude or the transmission parameter for drive current, by one step, achieving transmission setting for the electronic circuit board 13*i* (Step ST52). The host control board 11 then determines whether the notification indicates that signal received now have a sufficiently high level in the electronic circuit board 13*i* (Step ST53). Step ST52 is repeated until the host control board 11 receives the notification indicating that signal received has reached a sufficiently high level. If the notification indicates that signal received now have a sufficiently high level (if Yes in Step ST53), host control board 11 stops Step ST52, and causes the electronic circuit board 13*i* to stop increasing the transmission parameter.

Figure 7:
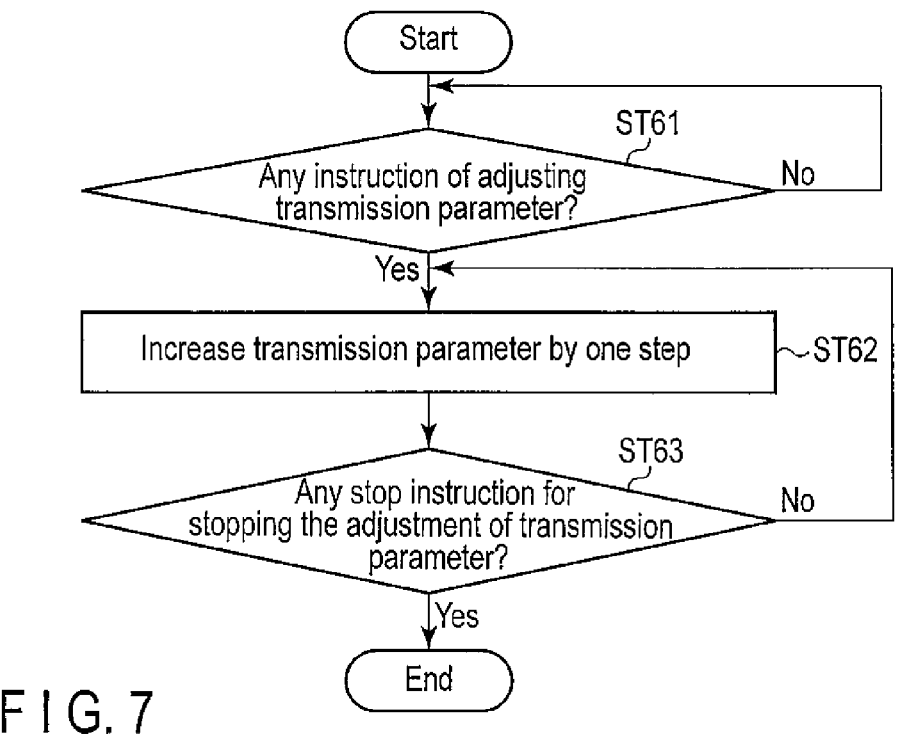
FIG. 7 is a flowchart showing the transmission setting process performed in the monitor/control unit provided on each electronic circuit board used in the embodiment of FIG. 1.

In the electronic circuit board 13*i*, the monitor/control unit B4 receives a transmission setting instruction from the host control board 11 (Step ST61) as shown in FIG. 7. Then, the monitor/control unit B4 controls the parameter setting unit B3 which increases, by one step, the signal amplitude for the transmitting/receiving circuit unit C1*i* or the transmission parameter for the drive current (Step ST62). The monitor/control unit B4 then repeatedly increases the transmission parameter, until it receives a stop instruction (Step ST63).

In the switching process board 12, if the received signal is found to have a sufficiently high level (if Yes in Step ST42), the monitor/control unit C4 monitors the bit-errors state of the transmitting/receiving circuit unit C1*i* (Step ST47). Then, the monitor/control unit C4 determines whether signal has bit errors or not (Step ST48). If bit errors are found (if Yes in Step ST48), the monitor/control unit C4 controls the parameter setting unit C3, causing the same to adjust the parameter of the reception equalizer (Step ST49). Then, the monitor/control unit C4 returns to Step ST47, and keeps monitoring the bit-errors state. If bit errors are not found (if No in Step ST48), the reception setting process is terminated. Once the process has completed, the switching process board 12 can reliably receive transmission signals.

In the conventional electronic apparatus, each electronic circuit board and each switching process board are set to fixed transmission mode and fixed reception mode as described above. Consequently, the distance for which good transmission quality can be acquired between the boards is limited. This limits the number of slots that can be used even if the apparatus has many free slots. In the present embodiment, both the transmission parameter and the reception parameter can be set to appropriate values at the monitor/control unit C4 of the switching process board 12 and at the monitor/control unit B4 of each electronic circuit board 13*i*, through the host control board 11. Good transmission quality can therefore be acquired, no matter into which third slot S3*i* the electronic circuit board 13*i* has been inserted. Thus, any electronic circuit board can be inserted into any free slot available, increasing the freedom of mounting electronic circuit boards in the electronic apparatus. In addition, since each circuit board need not be set for transmission or reception every time it is used. This helps to reduce the operating cost of the electronic apparatus.

In the embodiment described above, the switching process boards and the electronic circuit boards have a parameter setting unit each. Alternatively, each switching process board and each electronic circuit board may have, respectively, a transmission parameter setting unit and a reception parameter setting unit, or vice versa. In either case, the embodiment operate just the same way.

Moreover, the electronic circuit boards 131 to 13*n* can be, for example, a memory board, an interface board for connection with various communication devices, and a decoder/encoder board, etc.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising: a transmitter comprising a plurality of free slots configured to connect boards to a transmission path and a fixed slot connected to the free slots by the transmission path, the free slots associated with a plurality of channels; a host controller configured to manage quality of signals transmitted from and to the boards connected to the free slots and a dedicated slot; an electronic circuit board configured to be inserted into one of the free slots associated with the channels, the electronic circuit board comprising: a first transceiver configured to transmit and receive signals through the transmission path in accordance with a transceiver parameter, a transceiver controller configured to control a transceiver process at the first transceiver, a first parameter setting unit configured to set the transceiver parameter to the first transceiver, and a first controller configured to monitor the operating state of the first transceiver and to control the first parameter setting unit; and a switching process board configured to be connected to the dedicated slot, the switching process board comprising: a plurality of second transceivers configured to transmit and receive signals between electronic circuit boards configured to be connected to the free slots in accordance with the transceiver parameter, a switch unit configured to turn on or off the second transceivers, a second parameter setting unit configured to set the transceiver parameter to the second transceivers associated with the channels, and a second controller configured to monitor the operating state of each second transceiver and control the second parameter setting unit, wherein, while any one electronic circuit board remains inserted in one free slot in an initial state, the first controller is configured to monitor a receiving state of the first transceiver and control the first parameter setting unit, causing the first parameter setting unit to change the transceiver parameter of the first transceiver, and if the receiving state remains unchanged to a first state, the first controller is configured to inform the host controller that the receiving state remains unchanged to the first state; the host controller is configured to instruct the switching process board to designate a channel to change the first state, the receiving state of the electronic circuit board associated with the channel and informed of the instruction; and the second controller is configured to cause the second parameter setting unit to change the transceiver parameter of the second transceiver of the channel designated by the host controller.

2. The electronic apparatus of claim 1, wherein the transmission path is a serial bus, and the first transceiver and each second transceiver is a SERializer or DESerializer.

3. The electronic apparatus of claim 1, wherein the first controller is configured to monitor a signal received from the transmitter and change a reception gain as the transceiver parameter.

4. The electronic apparatus of claim 1, wherein the first controller is configured to monitor bit errors in a signal received from the transmitter and change an equalizer value as the transceiver parameter.

5. The electronic apparatus of claim 1, wherein the second controller is configured to change at least a signal amplitude or a drive current as the transceiver parameter.

6. The electronic apparatus of claim 1, wherein the transmitter comprises a notification unit configured to notify a slot ID code to each of the free slots associated with the channels; and the parameter setting unit of the electronic circuit board is configured to: register transceiver parameters for the free slots associated with the free slots, receive a slot ID code notified from the notification unit when one of the electronic circuit boards is inserted into a free slot, read the transceiver parameter associated with the slot ID code, and set the transceiver parameter to the first transceiver.

7. An electronic apparatus comprising: a transmitter comprising a plurality of free slots configured to connect boards to a transmission path and a fixed slot connected to the free slots by the transmission path, the free slots associated with a plurality of channels; a host controller configured to manage quality of signals transmitted from and to the boards connected to the free slots and a dedicated slot; an electronic circuit board configured to be inserted into one of the free slots associated with the channels, the electronic circuit board comprising: a first transceiver circuit unit configured to transmit and receive signals through the transmission path in accordance with a transceiver parameter, a transceiver controller configured to control a transceiver process at the first transceiver, a first parameter setting unit configured to set the transceiver parameter to the first transceiver, and a first controller configured to monitor the operating state of the first transceiver and to control the first parameter setting unit; and a switching process board configured to be connected to the dedicated slot, and the switching process board comprising: a plurality of second transceivers configured to transmit and receive signals between electronic circuit boards configured to be connected to the free slots in accordance with a transceiver parameter, a switch unit configured to turn on or off the second transceivers, a second parameter setting unit configured to set the transceiver parameter to the second transceivers associated with the channels, and a second controller configured to monitor the operating state of each second transceiver and control the second parameter setting unit, wherein, while any one electronic circuit board remains inserted in one free slot in an initial state, the second controller is configured to monitor a receiving state of the second transceiver associated with each channel and control the second parameter setting unit, causing the second parameter setting unit to change the transceiver parameter of the second transceiver, and if the receiving state remains unchanged to a first state, the second controller is configured to inform the host controller that the receiving state remains unchanged to the first state; the host controller is configured to instruct the electronic circuit board associated with the channel to change the transmission parameter so that the receiving state of the second transceiver associated with the channel changes to the first state; and the first controller is configured to cause the first parameter setting unit to change the transceiver parameter of the first transceiver in accordance with an instruction from the host controller.

8. The electronic apparatus of claim 7, wherein the transmission path is a serial bus, and the first transceiver and each second transceiver is a SERializer or DESerializer.

9. The electronic apparatus of claim 7, wherein the second controller is configured to monitor a signal received from the transmitter and change a reception gain as the transceiver parameter.

10. The electronic apparatus of claim 7, wherein the second controller is configured to monitor bit errors in a signal received from the transmitter and change an equalizer value as the transceiver parameter.

11. The electronic apparatus of claim 7, wherein the first controller is configured to change at least a signal amplitude or a drive current as the transceiver parameter.

12. The electronic apparatus of claim 7, wherein the transmitter comprises a notification unit configured to notify a slot ID code to each of the free slots associated with the channels; and the parameter setting unit of the electronic circuit board is configured to: register transceiver parameters for the free slots associated with the free slots, receive a slot ID code notified from the notification unit when one of the electronic circuit boards is inserted into a free slot, read the transceiver parameter associated with the slot ID code, and set the reception parameter to the first transceiver.

13. An electronic apparatus comprising: a transmitter comprising a plurality of free slots configured to connect boards to a transmission path and a fixed slot connected to the free slots by the transmission path, the free slots associated with a plurality of channels; a host controller configured to manage quality of signals transmitted from and to the boards connected to the free slots and a dedicated slot; an electronic circuit board configured to be inserted into one of the free slots associated with the channels, the electronic circuit board comprising: a first transceiver configured to transmit and receive signals through the transmission path in accordance with a transceiver parameter, a transceiver controller configured to control a transceiver process at the first transceiver, a first parameter setting unit configured to set the transceiver parameter to the first transceiver, and a first controller configured to monitor the operating state of the first transceiver and to control the first parameter setting unit; and a switching process board configured to be connected to the dedicated slot, and the switching process board comprising: a plurality of second transceivers configured to transmit and receive signals between electronic circuit boards configured to be connected to the free slots in accordance with a transceiver parameter, a switch unit configured to turn on or off the second transceivers, a second parameter setting unit configured to set the transceiver parameter to the second transceivers associated with the channels, and a second controller configured to monitor the operating state of each second transceiver and control the second parameter setting unit, wherein, while any one electronic circuit board remains inserted in one free slot in an initial state, the first controller of the electronic circuit board is configured to monitor a receiving state of the first transceiver and control the first parameter setting unit, causing the first parameter setting unit to change the transceiver parameter of the first transceiver, and if the receiving state remains unchanged to a first state, the first controller is configured to inform the host controller that the receiving state remains unchanged to the first state; the host controller is configured to instruct the switching process board to designate a channel to change the first state, the receiving state of the electronic circuit board associated with the channel and informed the instruction; the second controller is configured to cause the second parameter setting unit to change the transceiver parameter of the second transceiver of the channel designated by the host controller; the second controller is configured to monitor the receiving state of the second transceiver circuit unit associated with each channel and control the second parameter setting unit, causing the second parameter setting unit to change the transceiver parameter of the second transceiver, and if the receiving state remains unchanged to a first state, the second controller unit is configured to inform the host controller that the receiving state remains unchanged to the first state; the host controller is configured to instruct the electronic circuit board associated with the channel to change the transceiver parameter so that the receiving state of the second transceiver associated with the channel changes to the first state; and the first controller of the electronic circuit board is configured to cause the first parameter setting unit to change the transceiver parameter of the first transceiver in accordance with an instruction from the host controller.

* * * * *